United States Patent
Spisak et al.

(10) Patent No.: US 10,423,777 B2
(45) Date of Patent: Sep. 24, 2019

(54) PREVENTING EXECUTION OF MALICIOUS INSTRUCTIONS BASED ON ADDRESS SPECIFIED IN A BRANCH INSTRUCTION

(71) Applicant: Endgame, Inc., Atlanta, GA (US)

(72) Inventors: Matthew D. Spisak, Columbus, OH (US); Cody R. Pierce, Austin, TX (US); Kenneth D. Fitch, San Antonio, TX (US)

(73) Assignee: Endgame, Inc., Arlington, VA (US)

( * ) Notice: Subject to any disclaimer, the term of this patent is extended or adjusted under 35 U.S.C. 154(b) by 259 days.

(21) Appl. No.: 15/099,494

(22) Filed: Apr. 14, 2016

(65) Prior Publication Data

US 2017/0300688 A1 Oct. 19, 2017

(51) Int. Cl.
| | |
|---|---|
| G06F 21/00 | (2013.01) |
| G06F 21/51 | (2013.01) |
| G06F 3/06 | (2006.01) |
| G06F 9/30 | (2018.01) |
| G06F 9/32 | (2018.01) |
| G06F 21/55 | (2013.01) |
| G06F 21/56 | (2013.01) |
| G06F 11/30 | (2006.01) |

(52) U.S. Cl.
CPC .............. *G06F 21/51* (2013.01); *G06F 3/065* (2013.01); *G06F 3/0619* (2013.01); *G06F 3/0673* (2013.01); *G06F 9/3004* (2013.01); *G06F 9/30058* (2013.01); *G06F 9/30145* (2013.01); *G06F 9/32* (2013.01); *G06F 11/30* (2013.01); *G06F 21/554* (2013.01); *G06F 21/566* (2013.01); *G06F 2221/033* (2013.01)

(58) Field of Classification Search
CPC ............. G06F 21/51; G06F 9/32; G06F 9/254
USPC ........................................................... 726/23
See application file for complete search history.

(56) References Cited

U.S. PATENT DOCUMENTS

| | | | |
|---|---|---|---|
| 2010/0281540 A1 | 11/2010 | Alme | |
| 2011/0264894 A1 | 10/2011 | Lin | |
| 2013/0036464 A1 | 2/2013 | Glew | |
| 2013/0145429 A1* | 6/2013 | Mendel | G06F 21/00 726/4 |
| 2013/0283382 A1 | 10/2013 | Kim | |
| 2014/0075556 A1* | 3/2014 | Wicherski | G06F 21/554 726/23 |
| 2014/0281713 A1* | 9/2014 | Hampapur | G06F 11/079 714/26 |
| 2014/0298112 A1* | 10/2014 | Otsuka | G06F 11/3452 714/47.3 |
| 2015/0052339 A1* | 2/2015 | Suzuki | G06F 9/3806 712/240 |
| 2015/0095628 A1 | 4/2015 | Yamada | |
| 2016/0196425 A1* | 7/2016 | Davidov | G06F 21/566 726/23 |

* cited by examiner

*Primary Examiner* — Haresh N Patel
(74) *Attorney, Agent, or Firm* — DLA Piper LLP (US)

(57) ABSTRACT

In one aspect of the embodiments, malicious instructions executed or to be executed by a processor in a computing device are identified and preventive action is taken in response to that detection, thereby preventing harm to the computing device and the user's data by the malicious instructions. In another aspect of the embodiments, a thread context monitor determines which thread are active within an operating system at any given time, which further enhances the ability to determine which thread contains malicious instructions.

5 Claims, 14 Drawing Sheets

| Address | Instruction |
|---------|-------------|
| 0001 | ADD Register A Register B Register C |
| 0002 | BRANCH 0004 |
| 0003 | LOAD Register D 5587 |
| 0004 | STORE Register C |
| 0005 | ADD Register C Register D Register E |
| ... | |

| Address | Instruction |
|---|---|
| 0001 | ADD Register A Register B Register C |
| 0002 | BRANCH 0004 |
| 0003 | LOAD Register D 5587 |
| 0004 | STORE Register C |
| 0005 | BRANCH Register A |
| ... | |
| 8000 | LOAD Register E |
| ... | |
| 9000 | *Beginning of Malicious Code* |

Register A

| Address | Instruction |
|---|---|
| 10000 | ~~LOAD Register E~~ BRANCH 9000 |

FIGURE 10

Processor 110
- Malware Prevention Module 810

Preventive Actions 945
- Issue alert to user, administrator, and/or operating system 210
- Freeze application or module
- Reboot computing device 100

FIGURE 13

Thread Log 1300

| Timestamp 1310 | Thread Event 1310 |
|---|---|
| X | Thread 1130 starts |
| X+1 | Thread 1130 stops |
| X+2 | Thread 1140 starts |
| X+3 | Thread 1150 starts |
| ... | |

FIGURE 14

Thread Log 1300

| Timestamp 1310 | Thread 1130 Event 1430 | Thread 1140 Event 1440 | Thread 1150 Event 1450 |
|---|---|---|---|
| X | Thread 1130 starts | | |
| X+1 | Thread 1130 stops | | |
| X+2 | | Thread 1140 starts | |
| X+3 | | | Thread 1150 starts |
| ... | | | |

PREVENTING EXECUTION OF MALICIOUS INSTRUCTIONS BASED ON ADDRESS SPECIFIED IN A BRANCH INSTRUCTION

FIELD OF THE DISCLOSURE

The present disclosure relates to a system and method for detecting malicious instructions executed or to be executed by a processor in a computing device and to take preventive action in response to that detection. These embodiments can prevent harm to the computing device and the user's data by viruses and malware.

BACKGROUND

As computing devices become increasingly complex, viruses and malware also are becoming increasingly complex and difficult to detect and prevent. While the prior art includes many approaches for scanning non-volatile storage such as a hard disk drive for such threats, the prior art includes few satisfactory solutions for detecting malicious code loaded into memory or the processor itself. The prior art also is lacking in the ability to detect malicious instructions before they are executed, particularly in situations where the malicious instructions are "new" or are known instructions used in a new way and are not part of a well-known virus or malware.

FIG. 1 depicts an exemplary prior art computing device 100 comprising processor 110 and memory 120. One of ordinary skill in the art will understand that processor 110 can include a single processor core or multiples processor cores as well as numerous cache memories, as is known in the prior art.

In FIG. 2, software code and user data are loaded into memory 120. In this example, each set of software code is assigned a certain range in memory 120. Operating system 210 is assigned addresses 0001-0200, utility program 220 is assigned addresses 0201-0300, application program 230 is assigned addresses 0301-0350, application program 240 is assigned addresses 0351-0450, user data 250 is assigned addresses 0450-0700, and the addresses 0701-9999 at this point are unassigned addresses 260. These addresses are intentionally simplified for purposes of discussion and illustration, and one of ordinary skill in the art will appreciate that in an actual implementation, addresses would be binary numbers instead of base-10 numbers and potentially would span a much larger address space. For instance, typical address space in prior art memory 120 includes 32-bit and 64-bit addresses.

FIG. 3 shows a simplified sequence of instructions stored in memory. Address 0001 contains an ADD instruction, address 0002 contains a BRANCH instruction, address 0003 contains a LOAD instruction, address 0004 contains a STORE instruction, and address 0005 contains an ADD instruction. The BRANCH instruction at address 0002, when executed, will cause the processor to next execute the instruction at address 0004.

FIG. 4 depicts a common approach of malicious code in the prior art. Here, the instruction at address 0005 is a BRANCH instruction to the address stored in Register A, which is address 10000. However, in this example, a virus or malware hijacks the BRANCH instruction by modifying the contents of Register A to cause processor 110 to execute the instruction stored at address 9000, which is the beginning point for malicious code. This causes the malicious instructions to be executed instead of the intended instructions. This is often referred to as a "control-flow hijack," because the malicious instructions interrupt and take over the control-flow of processor 110. A control-flow hijack represents the very first point in which an attacker is able to redirect control-flow of a running process.

What is needed is a mechanism for detecting suspicious BRANCH instructions and to prevent the system from performing the BRANCH if the associated address is likely to contain malicious instructions.

Another aspect of the prior art is shown in FIG. 11. Processor 110 runs operating system 210. Operating system 210 comprises scheduler 1110 and asynchronous procedure calls unit 1120. Operating system 210 is capable of operating multiple threads at once (such as threads 1130, 1140, 1150, and 1160), where each thread is a set of code that form a process or related processes. Scheduler 1110 determines which threads to run and it follows various algorithms to determine when to start and stop a particular thread. One drawback of certain prior art operating systems 210 (such as Microsoft Windows®) is that operating system 210 does not indicate to other software when it is starting or stopping a thread (known as thread context switching). As a result, malware prevention software is unable to distinguish between threads that may potentially contain a threat and threads that are relatively innocuous, which means that malware prevention software must analyze all threads, which may add unnecessary performance overhead to the operating system.

What is further needed is a mechanism to allow code outside of operating system 210 to identify when each thread starts and stops so that it can better target suspicious instructions.

BRIEF SUMMARY OF THE INVENTION

In one aspect of the invention, a whitelist of known valid branch addresses is generated. Then whenever a new or existing thread is executing, all BRANCH instructions are checked against the whitelist before they are executed. If a BRANCH instruction refers to an address that is not on the whitelist, the system can take preventive action, as the code contained at that address is likely to be malicious.

In another aspect of the invention, a thread context monitor determines which threads are active within an operating system at any given time, which enables the system to turn the malware detection logic off for threads that are relatively innocuous, which decreases the performance overhead of the software.

BRIEF DESCRIPTION OF THE DRAWINGS

FIG. 3 depicts a BRANCH instruction as used in the prior art.

FIG. 4 depicts a BRANCH instruction that leads to an address containing malicious code, as in the prior art.

FIG. 10 depicts exemplary preventive actions.

FIG. 13 depicts an embodiment of a thread log.

FIG. 14 depicts another embodiment of a thread log.

DETAILED DESCRIPTION OF PREFERRED EMBODIMENTS

Figure 1:
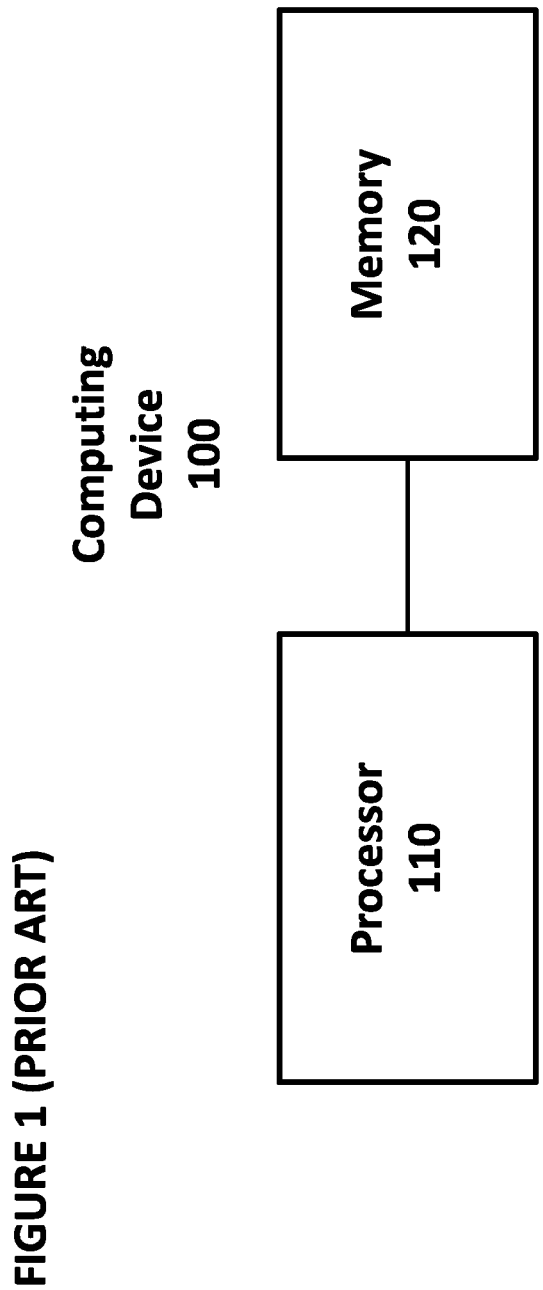
FIG. 1 depicts a prior art computing device.
Figure 2:
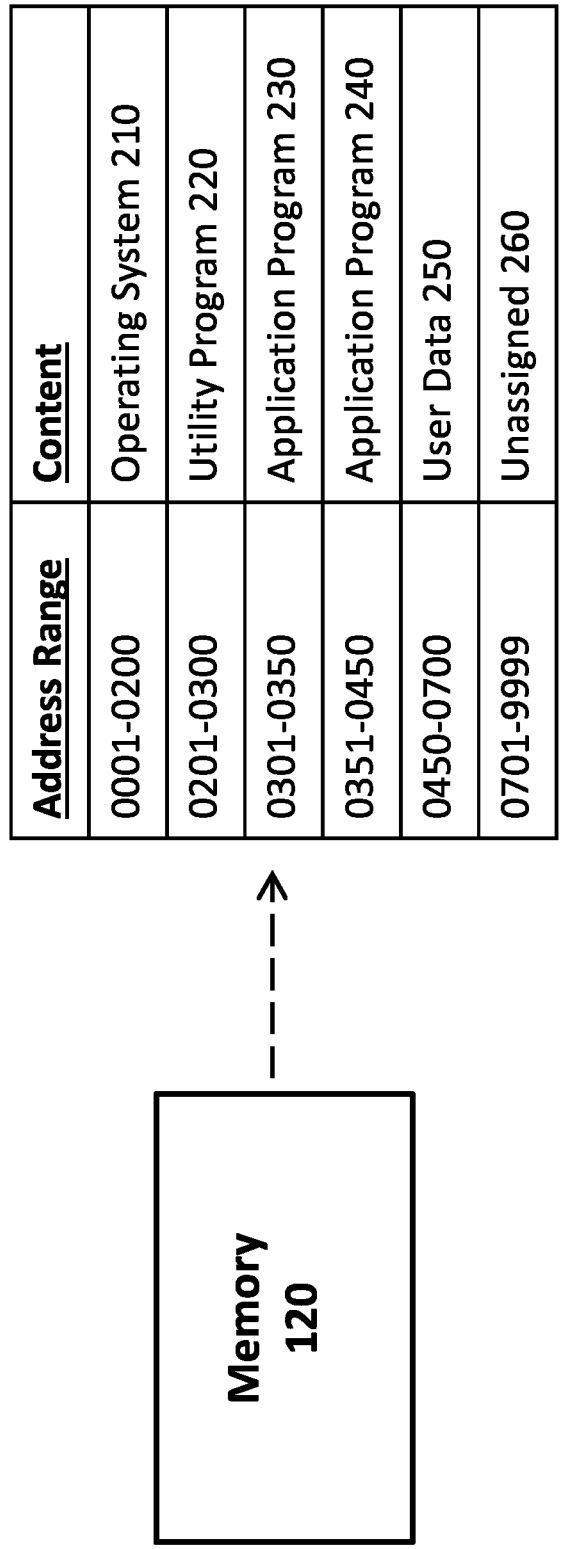
FIG. 2 depicts an exemplary set of software code in the prior art.
Figure 5:
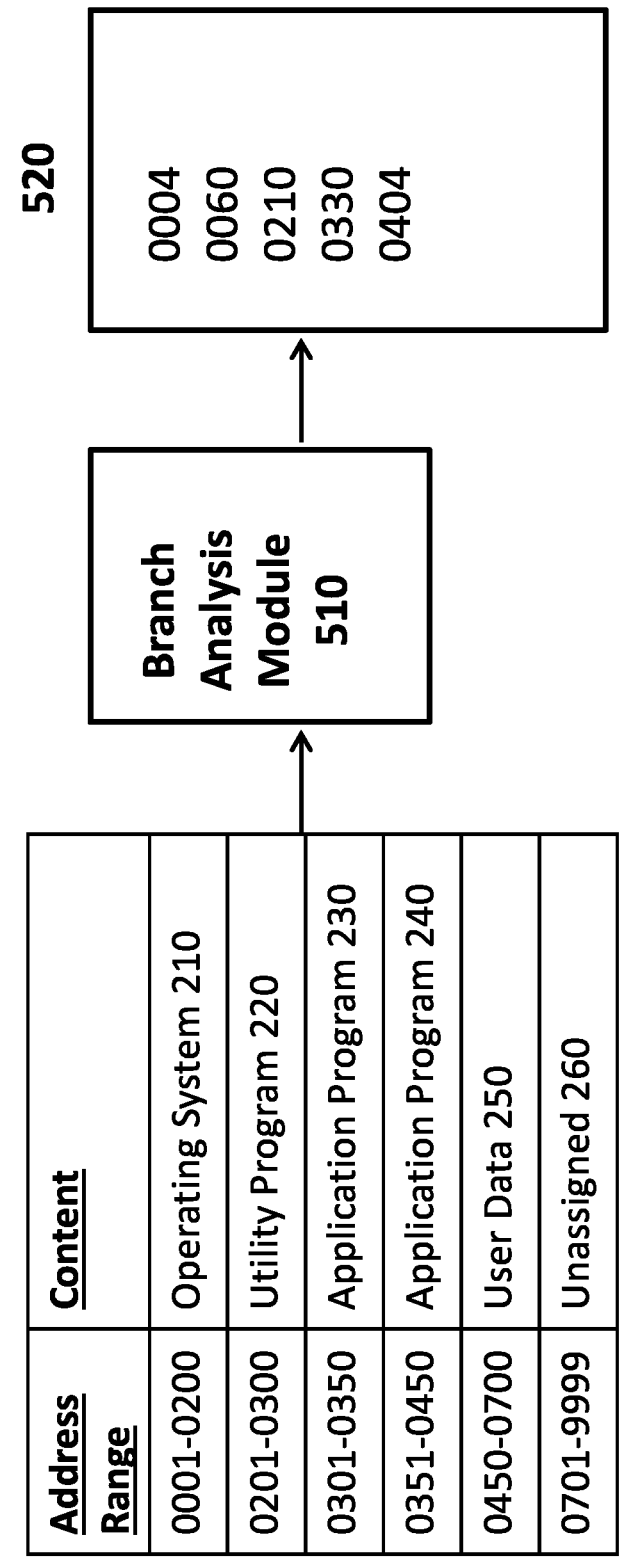
FIG. 5 depicts an embodiment of a branch analysis module.

FIG. 5 depicts one embodiment of the invention. Branch analysis module 510 runs on processor 110 and comprises lines of executable computer code. Branch analysis module 510 analyzes all instructions contained in memory 120. For each BRANCH instruction that it finds, it determines if that BRANCH instruction refers to an address assigned to a software module that is a known, legitimate software module. If the address is assigned to such a software module, then the address is added to whitelist 520, which contains a list of known, valid branch locations. If the address is not assigned to such a software module, then the address is not added to whitelist 520, as the BRANCH instruction for that address may be a portion of malicious code.

Figure 6:
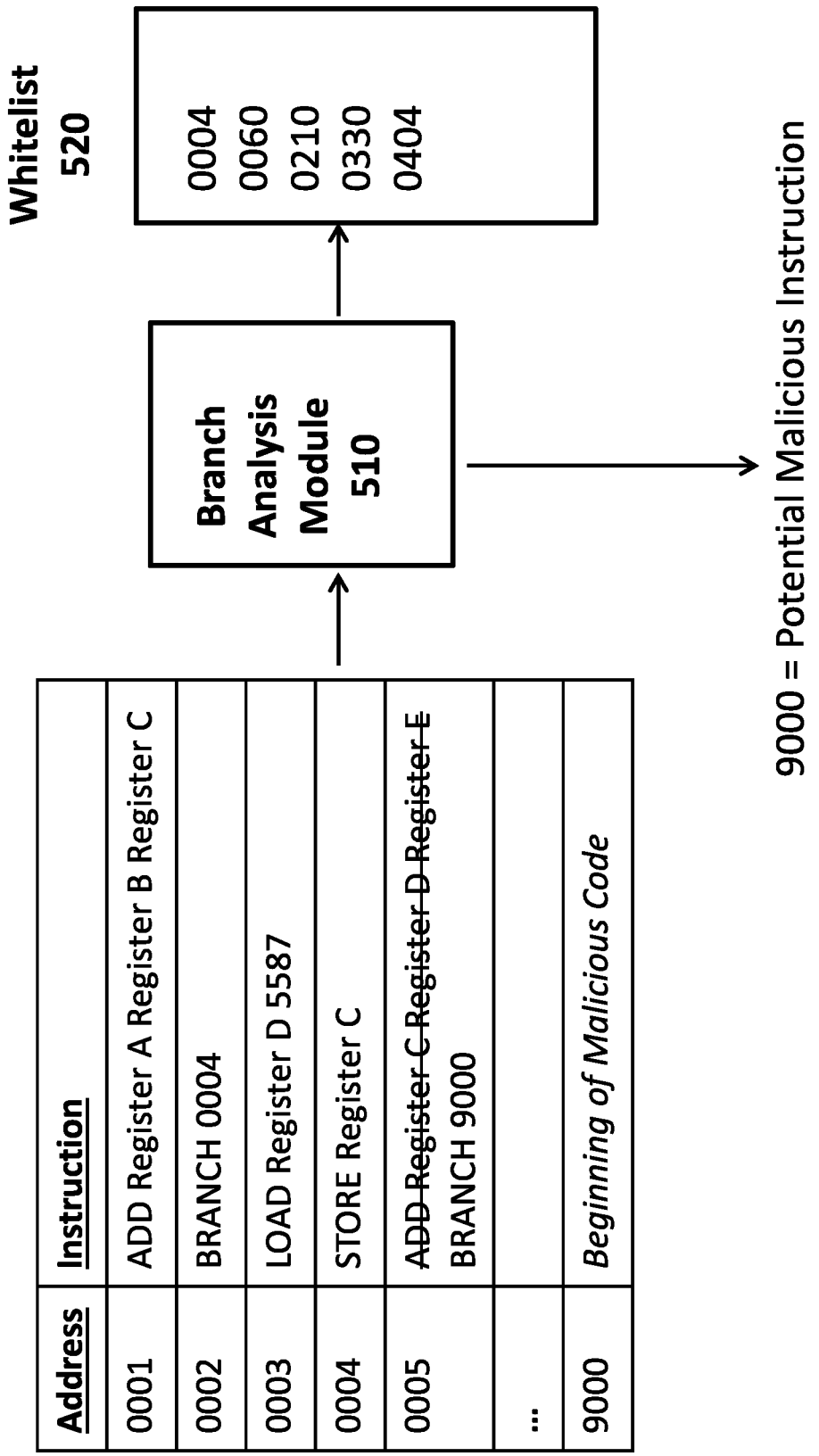
FIG. 6 depicts a branch analysis module generating a whitelist of safe branch addresses and identifying suspicious branch addresses.

Thus in the example of FIG. 6, branch analysis module 510 populates whitelist 520 with the entries 0004, 0060, 0210, 0330, 0404, which represent destinations of BRANCH instructions that are located with an address range assigned to a known, legitimate software module. On the other hand, the address 9000 is not placed on whitelist 520 and instead is identified as potential malicious code, as address 9000 is contained with the unassigned address range. It is unlikely that a legitimate software module would execute a BRANCH to a location in the unassigned address range.

Additional detail regarding branch analysis 510 is now provided. Branch analysis module 510 parses software code stored in memory 120, which comprise binary executable files, and separates the code into its appropriate sections. Relocation information in the form of an absolute address is retrieved from data sections of each executable image, such as a BRANCH instruction. Each absolute address that is found that falls within the address range of the binaries code section is considered to be a legitimate BRANCH destination and added to whitelist 520.

Branch analysis module 510 then scans the code section of each binary image in search of specific byte sequences that indicate CPU instructions that are loading an address into a register. Each address identified after the target byte sequence is treated as a relative instruction pointer (IP) address, and analysis is performed to determine whether the relative address falls into the code section of the binary image. Those that pass this criteria are considered legitimate BRANCH destinations.

Next, the algorithm scans for jump tables (switch statements) in code, and the code section for each loaded image is searched for an instruction byte sequence that indicates loading IP relative addresses into a register. If the relative address falls within a read-only data section of the binary, further analysis to identify jump tables is done as follows:

a. The first and second DWORD/QWORD at the data section offset is treated as an IP relative address. If both relative addresses when added to the offset of the load instruction points into the code section AND the two offsets within the code section are within a specific threshold of one another, then the structure in read-only data is treated as a jump table.

b. The first pass completes with the identification of all jump table locations in memory. Next, the algorithm traverses each potential entry in each jump table and treats each relative address as a jump destination (when added to the offset of the load instruction) until it encounters a relative address that does not point into the code section. Each branch destination found in each jump table is added to the whitelist.

Prior to being added to the whitelist, each branch location address that is identified in binary code is added to its appropriate base address of the binaries executable code page in virtual memory based on the memory map of the target thread of execution.

If processor 110 follows an instruction set architecture (ISA) where instructions are both larger than 8-bits and aligned on memory boundaries equal to a power of 2, then a further heuristic can be applied to ensure a candidate BRANCH destination lies on a 2, 4, 8, 16, 32, etc. byte aligned boundary depending on the instruction size and discarding those addresses that do not fall on that byte boundary.

Each function entry point or legitimate branch location address is stored in a data structure that allows for fast lookup. Additionally, the data structure ensures a reduced memory footprint for the storage of the branch location list. In one embodiment, the data structure is a simple sorted list upon which a binary search is performed. In another embodiment, the data structure is a hashtable data structure. In another embodiment, the data structure is a bloom filter data structure. One of ordinary skill in the art will appreciate that other types of data structures can be used.

Figure 7:
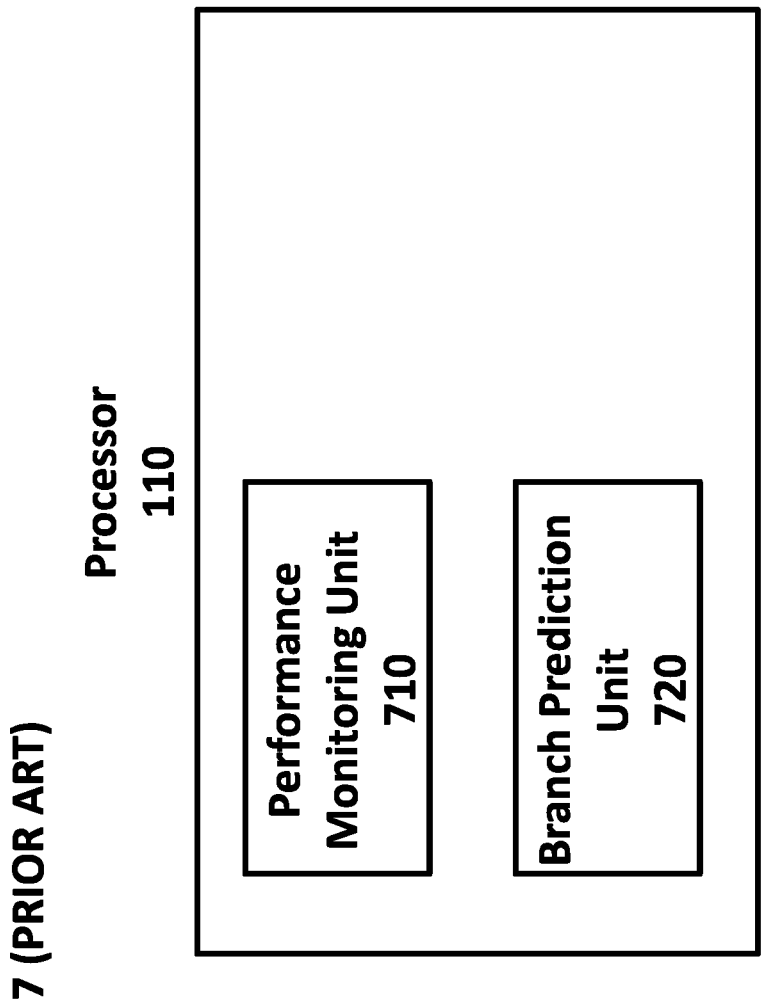
FIG. 7 depicts other aspects of a prior art processor.

FIG. 7 depicts another aspect of processor 110 found in the prior art. Processor 110 optionally comprises performance monitoring unit 710 and branch prediction unit 720. Branch prediction unit 720 enhances the performance of processor 110 by pre-fetching instructions at addresses that it deduces are likely to be the destination of BRANCH instructions. Processor 110 typically will load the pre-fetched instruction into a fast cache memory. Performance monitoring unit 710 measures the performance of processor 110 using certain criteria such as cache misses/hits and branch prediction misses/hits. If the branch prediction unit 720 continually misses on its branch predictions, then that will decrease the performance of processor 110. Such data can be made available by performance monitoring unit 710 to other software modules. In one embodiment, performance monitoring unit 710 is configured to perform a trap whenever any of these events of interest occur, which enables the integrity checking heuristics described above to be performed real-time during operation of processor 110.

Figure 8:
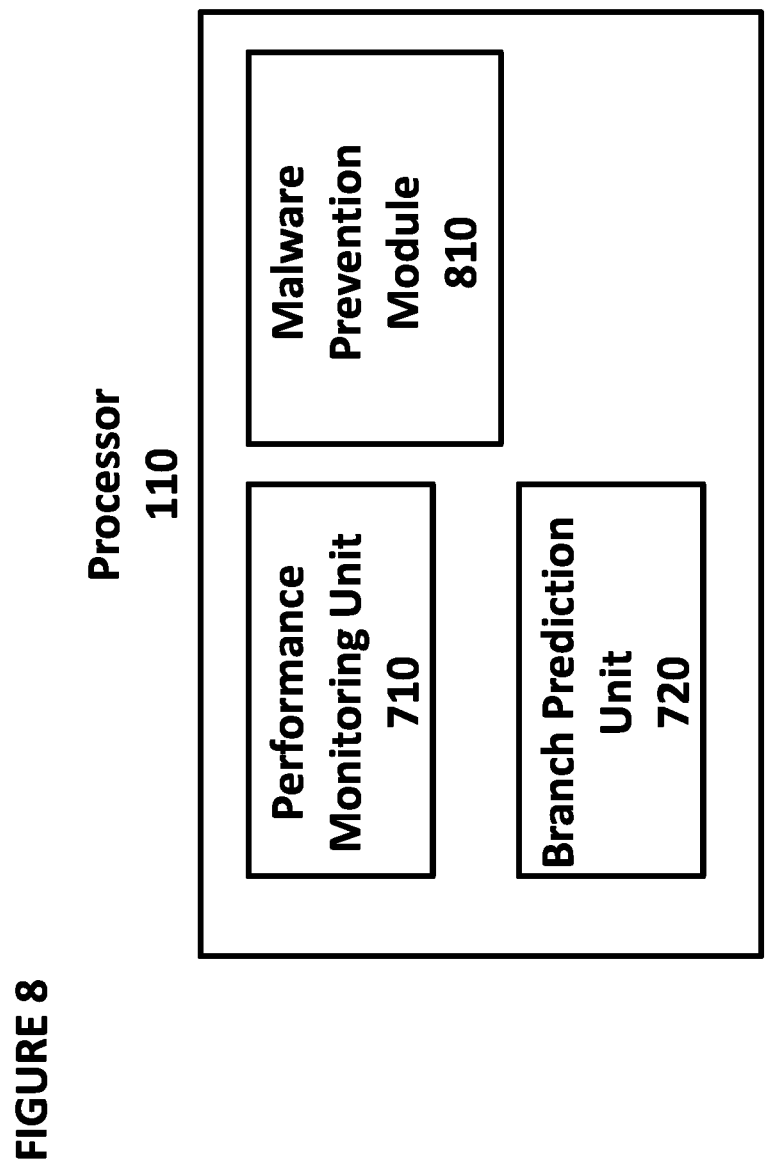
FIG. 8 depicts an embodiment of a malware prevention module.
Figure 9:
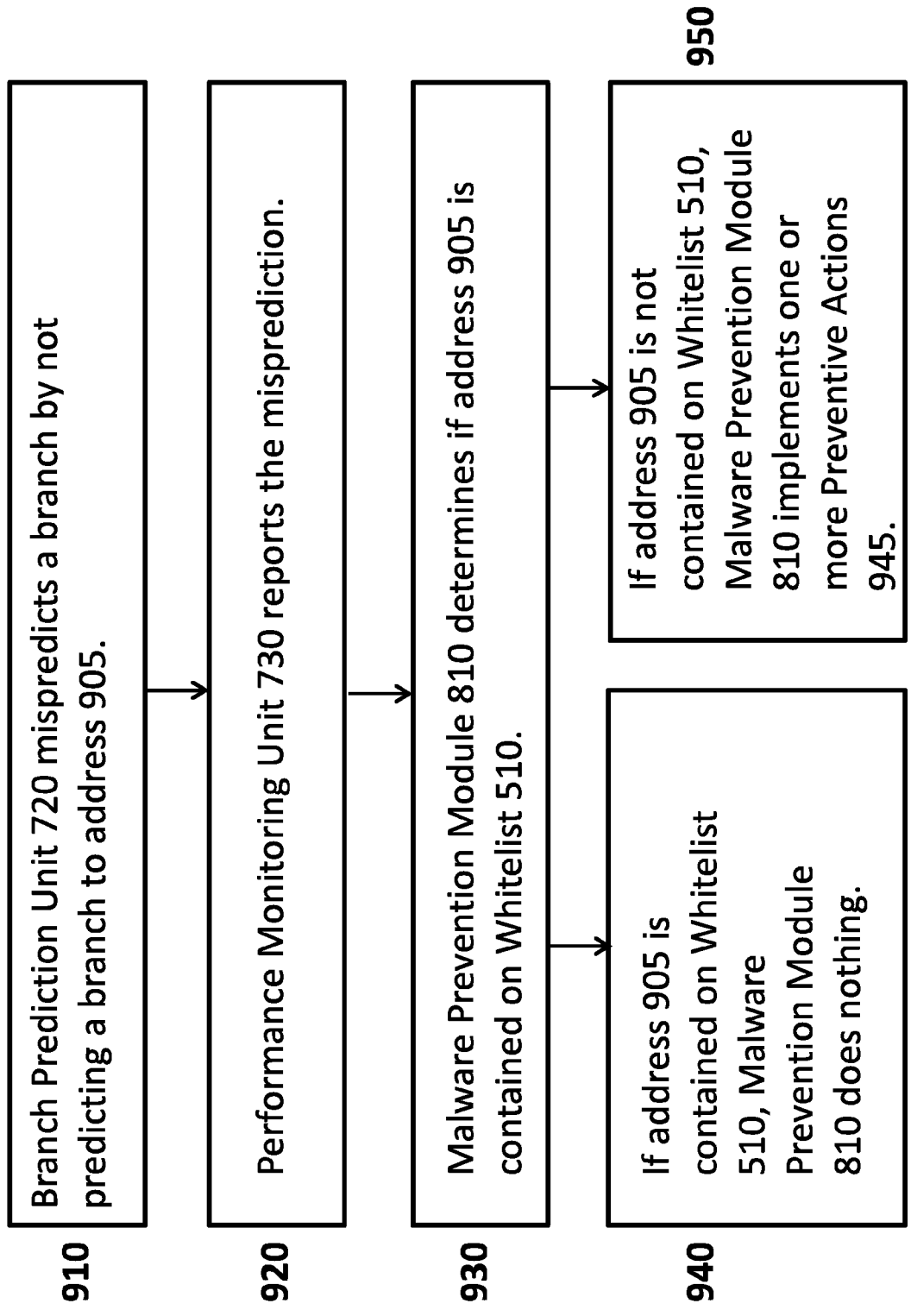
FIG. 9 depicts a method of identifying suspicious instructions and taking preventive action.
Figure 11:
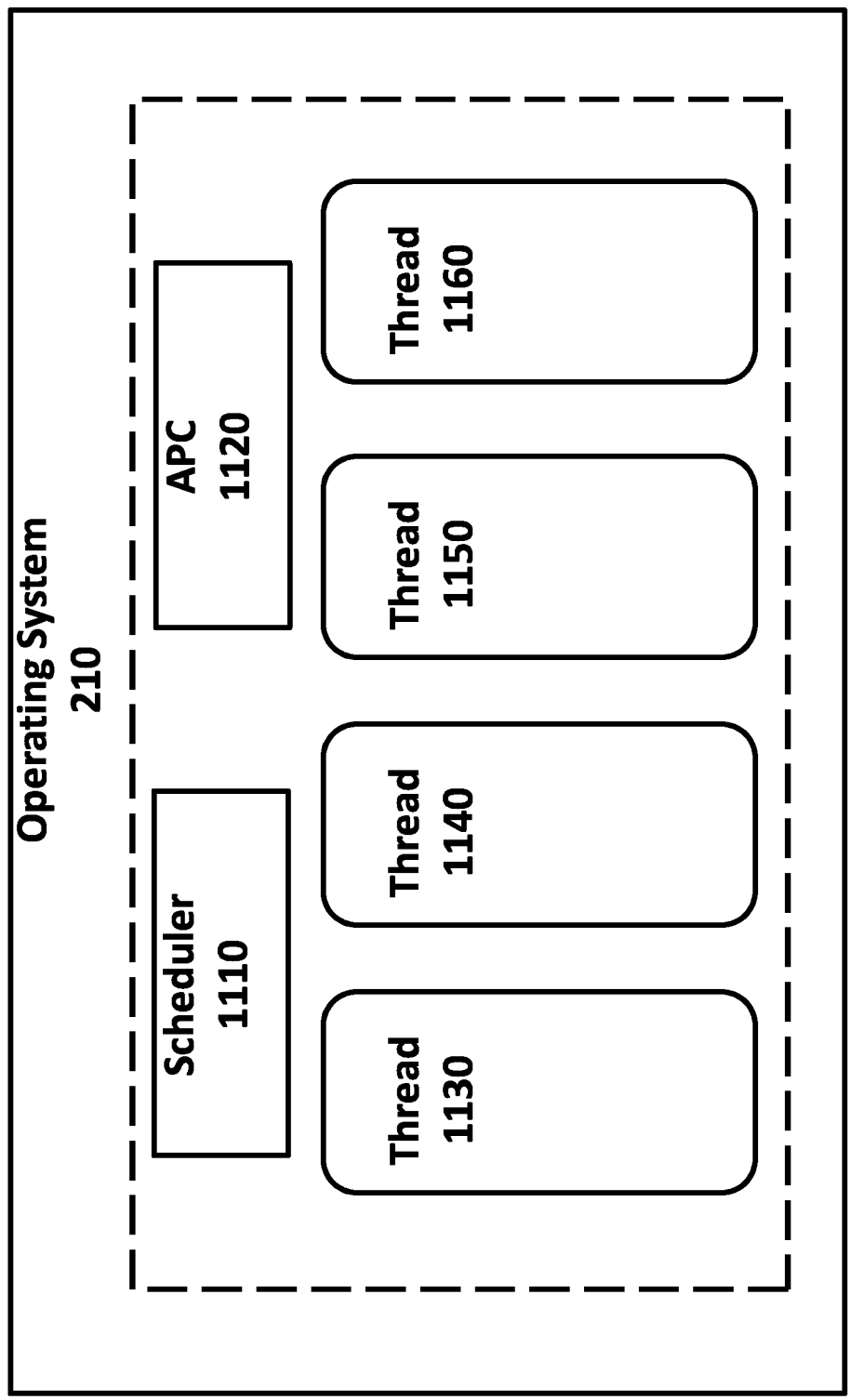
FIG. 11 depicts a multi-threaded prior art operating system.

Another aspect of the invention is shown in FIG. 8. Processor 110 runs malware prevention module 810, which are lines of software code. FIG. 9 depicts a method 900 performed by malware prevention module 810. Branch Prediction Unit 720 mispredicts a branch by not predicting a branch to address 905 (step 910). Performance Monitoring Unit 730 reports the misprediction (step 920). Malware Prevention Module 810 determines if address 905 is contained on Whitelist 510 (step 930). If address 905 is contained on Whitelist 510, Malware Prevention Module 810 does nothing (step 940). If address 905 is not contained on Whitelist 510, Malware Prevention Module 810 implements one or more Preventive Actions 945 (step 950).

FIG. 10 depicts examples of Preventive Actions 945. Preventive Actions 945 can include one or more of the following: issuing an alert to a user, administrator, and/or operating system 210; freezing the application or module in which the suspect instruction is contained; capturing a snapshot of memory 120; and rebooting computing device 100, which will cause processor 110 and memory 120 to be flushed.

Figure 12:
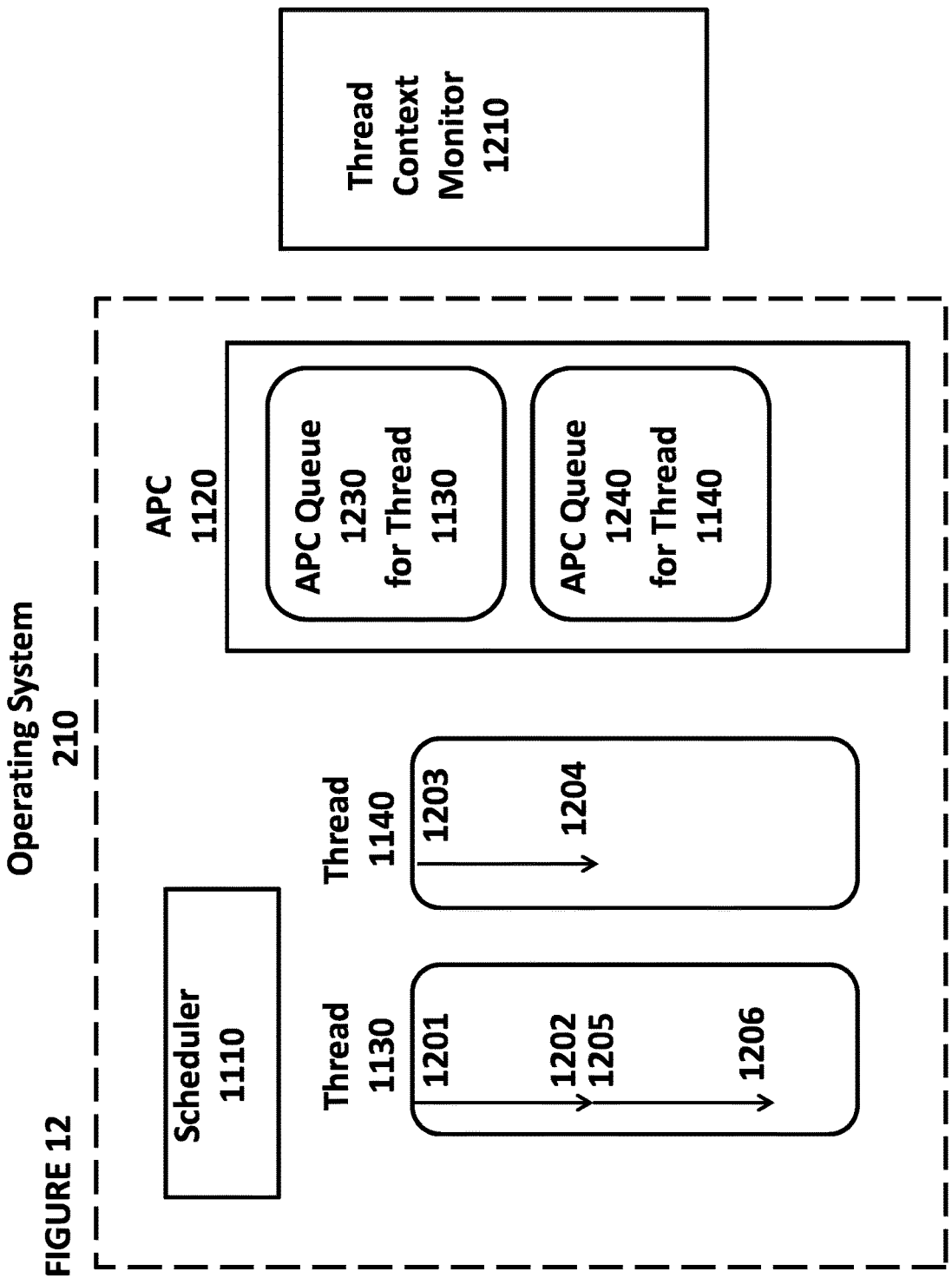
FIG. 12 depicts an embodiment of a thread context monitor.

FIG. 12 depicts another aspect of the invention that is particularly useful to the Microsoft Windows operating system. Thread context monitor 1210 comprises lines of software code executed by processor 110. Thread context monitor 1210 detects thread context changes in operating system 210. Thread context monitor 1210 instructs asynchronous procedure call module (APC) 1120, which is a component of operating system 210, to maintain a queue for each thread and to always have an entry in the queue instructing the thread to run a set of code. When a particular thread starts, it will run the code from its APC queue. When a different thread starts, the thread context monitor can conclude that the previous thread stopped on that processor. In this manner, thread context monitor 1210 can directly determine when a thread starts and indirectly determine when a thread stops. If suspicious code is identified, it will be easier to determine which thread contains the suspicious code as compared to prior art systems. In addition, thread context monitor 1210 can be used to turn on or turn off performance monitoring unit 710, malware prevention module 810, and/or branch prediction unit 720 depending on whether the active thread is a likely candidate for containing malware or is likely to be innocuous. This will decrease the performance overhead of the system.

In the example of FIG. 12, operating system 210 is running thread 1130 and thread 1140. Scheduler 1110 starts thread 1130 (step 1201), which causes a set of code in APC queue 1230 to execute, which in turn creates an APC event that is detected by thread context monitor 1210, which then concludes that thread 1130 is active.

At a later time, scheduler 1110 stops thread 1130 (step 1202) and starts thread 1140 (step 1203), which causes a set of code in APC queue 1240 to execute, which in turn creates an APC event that is detected by thread context monitor 1210, which then concludes that thread 1140 is active and consequently determines that thread 1130 is now inactive.

At a later time, scheduler 1110 stops thread 1140 (step 1204) and starts thread 1130 (step 1205) and later stops thread 1130 (step 1205). The starting of thread 1130 generates an APC event in the manner described above.

Thread context monitor 1210 can store data that indicates the state of the thread context. Under one approach, thread context monitor 1210 stores identification data for each thread that is currently active (e.g., after step 1201, it would store an ID for Thread 1130).

Under another approach shown in FIG. 13, thread context monitor 1210 maintains thread log 1300 which comprises a table or other data structure that indicates the context for each thread, and optionally keeps timestamp entries as well. Thread log 1300 indicates each start or stop to any thread in a common data field, thread event 1310.

Under a similar approach shown in FIG. 14, thread context monitor 1210 maintains thread log 1300 which comprises a table or other data structure that indicates the context for each thread individually (here, thread events 1430, 1440, and 1450 for threads 1130, 1140, and 1150, respectively), and optionally keeps timestamp entries as well.

Under the embodiments of FIGS. 12-14, thread context monitor 1210 can directly determine when a thread starts and indirectly determine when a thread stops, which can allow thread context monitor 1210 to turn on or turn off performance monitoring unit 710, malware prevention module 810, and/or branch prediction unit 720 depending on whether the active thread is a likely candidate for containing malware or is likely to be innocuous. Once suspicious code is identified, one or more of the Preventive Actions 945 can be performed, and these actions optionally now can include identifying the thread in which the suspicious code appeared.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of detecting malicious code within a computer system comprising a processor coupled to a memory device, the processor comprising a branch prediction unit and a performance monitoring unit, the method comprising:
generating a data structure containing one or more addresses, wherein each of the one or more addresses are within an address range assigned to a known software module;
detecting a failure by the branch prediction unit to predict an address that would be the subject of a branch instruction;
reporting, by the performance monitoring unit, the failure;
determining if the address is contained in the data structure; and
when the address is not contained in the data structure, implementing an action comprising one or more of issuing an alert, freezing a module in which the branch instruction is contained, capturing a snapshot of the memory device, and rebooting the computer system.

2. The method of claim 1, wherein the action comprises issuing an alert.

3. The method of claim 1, wherein the action comprises freezing a module in which the branch instruction is contained.

4. The method of claim 1, wherein the action comprises capturing a snapshot of the memory device.

5. The method of claim 1, wherein the action rebooting the computer system.

* * * * *